(12) United States Patent
Ali (10) Patent No.: US 10,530,144 B2
(45) Date of Patent: Jan. 7, 2020

(54) APPARATUS FOR MITIGATION OF ADVERSE EFFECTS OF GEOMAGNETICALLY INDUCED CURRENTS ON TRANSFORMERS

(71) Applicant: Mohd Hasan Ali, Germantown, TN (US)

(72) Inventor: Mohd Hasan Ali, Germantown, TN (US)

(*) Notice: Subject to any disclaimer, the term of this patent is extended or adjusted under 35 U.S.C. 154(b) by 0 days.

(21) Appl. No.: 16/364,408

(22) Filed: Mar. 26, 2019

(65) Prior Publication Data

US 2019/0312424 A1    Oct. 10, 2019

Related U.S. Application Data

(63) Continuation of application No. 14/975,507, filed on Dec. 18, 2015, now Pat. No. 10,243,346.

(60) Provisional application No. 62/093,701, filed on Dec. 18, 2014.

(51) Int. Cl.
| | |
|---|---|
| *H02H 9/08* | (2006.01) |
| *H02H 3/16* | (2006.01) |
| *H01F 27/34* | (2006.01) |
| *H02H 3/52* | (2006.01) |
| *H02H 5/00* | (2006.01) |
| *H02H 1/04* | (2006.01) |
| *H02H 1/00* | (2006.01) |
| *H02H 7/04* | (2006.01) |
| *H02H 9/00* | (2006.01) |

(52) U.S. Cl.
CPC .............. *H02H 3/16* (2013.01); *H01F 27/34* (2013.01); *H02H 3/52* (2013.01); *H02H 5/005* (2013.01); *H02H 1/0092* (2013.01); *H02H 1/04* (2013.01); *H02H 7/04* (2013.01); *H02H 9/005* (2013.01)

(58) Field of Classification Search
CPC ..... H02H 3/16; H02H 3/52; H02H 5/005; H02H 1/04; H02H 7/04; H02H 9/005; H01F 27/34
USPC ...... 361/17, 35, 46, 42, 93.1, 93.6; 324/126, 324/127, 244, 252
See application file for complete search history.

(56) References Cited

U.S. PATENT DOCUMENTS

| | | | | |
|---|---|---|---|---|
| 5,179,489 A | * | 1/1993 | Oliver | G05F 3/04 361/111 |
| 5,867,358 A | * | 2/1999 | Campbell | H02H 9/08 361/104 |
| 8,537,508 B2 | * | 9/2013 | Faxvog | H02H 3/52 361/35 |
| 2010/0213952 A1 | * | 8/2010 | Locker | G01R 19/06 324/658 |

* cited by examiner

*Primary Examiner* — Rajnikant B Patel
(74) *Attorney, Agent, or Firm* — Wayne Edward Ramage; Baker Donelson

(57) ABSTRACT

An apparatus for mitigating GIC (geomagnetically induced current) effects through a fuzzy logic controlled variable resistor. Under GIC conditions (or any unbalanced fault current condition), the GIC or unbalanced fault current flows through the neutral of a power transformer. It is detected by the fuzzy logic controller, which sends a signal to a switch to open. The resistor is in the circuit and impedes the flow of current through the neutral, thereby protecting the transformer from getting overheated.

6 Claims, 7 Drawing Sheets

GIC effects mitigation by fuzzy controlled variable resistor R

GIC effects mitigation by fuzzy controlled variable resistor R

FIG. 1

Membership functions of $I$

FIG. 2

Model of power system and GIC electric field

FIG. 3

GIC effects mitigation by
capacitor

FIG. 4

Transformer neutral current response under GIC condition.

FIG. 5

Transformer neutral current response under single line-to-ground (SLG) fault.

FIG. 6

Transformer neutral current response under double line-to-ground (2LG) fault

FIG. 7

Transformer neutral current response under line-to-line (2LS) fault

FIG. 8

APPARATUS FOR MITIGATION OF ADVERSE EFFECTS OF GEOMAGNETICALLY INDUCED CURRENTS ON TRANSFORMERS

This application is a continuation of U.S. patent application Ser. No. 14/975,507, filed Dec. 18, 2015, now issued as U.S. Pat. No. 10,243,346, issued Mar. 26, 2019, which claims benefit of and priority to U.S. Provisional Application No. 62/093,701, filed Dec. 18, 2014 by Mohd Hasan Ali, and is entitled to those filing dates for priority. The specifications, figures and complete disclosures of U.S. Provisional Application No. 62/093,701 and U.S. patent application Ser. No. 14/975,507 are incorporated herein in their entireties by specific reference for all purposes.

FIELD OF INVENTION

This invention relates to an apparatus for mitigating the adverse effects of geomagnetically induced currents (GIC) on transformers through the use of a fuzzy logic controlled variable resistor.

BACKGROUND OF THE INVENTION

Geomagnetically induced currents (GICs) are a naturally-occurring phenomenon initiated by solar activity. Sunspots (i.e., relatively cool areas on the sun shielded by complex magnetic fields) can give rise to solar flares and coronal mass ejections (CMEs). A CME carries its own electromagnetic currents and magnetic fields that are capable of affecting the Earth's magnetic field. Charged particle movement in the conductive ionosphere increases the current flows in the electrojets, which are currents in the order of millions of amperes located more than 100 kilometers above the Earth's surface. Electrojet currents induce quasi-DC voltages in electrical transmission lines, which, in turn, drive the flow of GICs wherever there is a path for them to flow.

GICs are often called quasi-DC currents because of their generally low frequency (0.1 mHz to 0.1 Hz), and thus the network response is essential resistive. A geomagnetic disturbance (GMD) event can last for one to two days, and continually generate relatively low to moderate levels of GICs with several intermittent periods of high GICs. The GICs can result in nonlinear operation of a power transformer and a significant increase of the exciting current. This also may then lead to generation of harmonics in the electrical current, unnecessary relay tripping, increased reactive power demands, voltage fluctuations and drops, and even a black-out of the entire system. Transformers may be overheated and, in the worst case, permanently damaged.

Prior art methods include using a capacitor or a capacitor with a resistor and metal oxide varistor (MOV) to mitigate the effects of GICs on transformers. However, these solutions generate extremely high voltages on such elements under short circuits in the main. Further, the value of the capacitor is kept fixed, which may act as an over-control or under-control, as is the control duration and magnitude. In addition, prior art methods are expensive.

Accordingly, what is needed is a cost-effective method to mitigate the adverse effects of GICs on power transformers.

SUMMARY OF INVENTION

In various embodiments, the present invention comprises an apparatus for mitigating GIC effects through a fuzzy logic controlled variable resistor. Under normal operating conditions, there is almost no current flowing through the neutral of the power transformer, so activation of the resistor (R) is not required. The switch (SW) is in a closed state. Under GIC conditions (or any unbalanced fault current condition), the GIC or unbalanced fault current flows through the neutral of the transformer. It is detected by the fuzzy logic controller, which sends a signal to the switch to open. The resistor (R) is in the circuit and impedes the flow of current through the neutral, thereby protecting the transformer from getting overheated.

The fuzzy logic controller works in any nonlinear, uncertain, or imprecise situation. The power transformer as well as the power network are highly nonlinear. The magnitude of the GIC or unbalanced fault current is very uncertain and variable (i.e., it can vary from a low level to a very high or severe level). The fuzzy logic control generates a signal for the switch and determines the proper value of the resistor based on the severity of the disturbance.

DETAILED DESCRIPTION OF EXEMPLARY EMBODIMENTS

Figure 1:
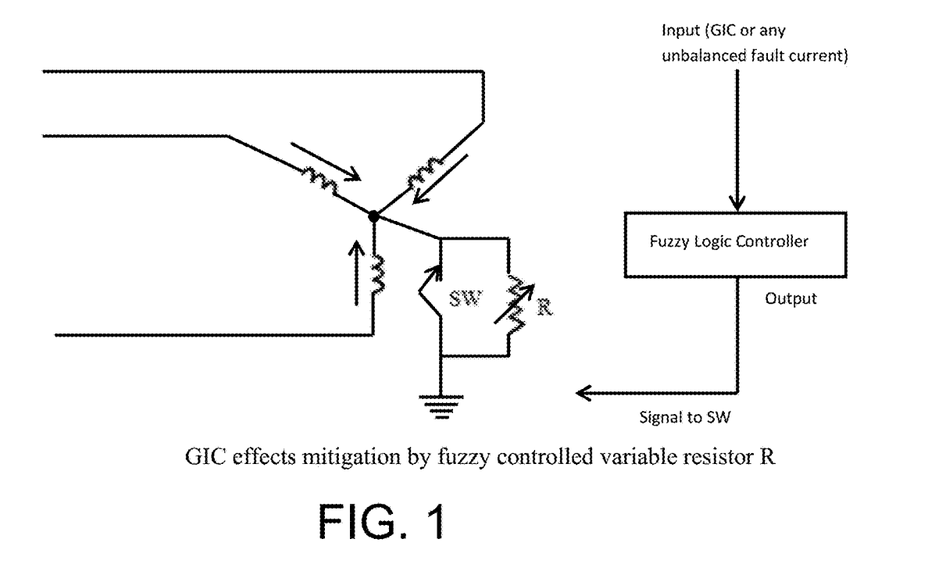
FIG. 1 shows a view of a system in accordance with an embodiment of the present invention.

In one exemplary embodiment, as seen in FIG. 1, the present system comprises an apparatus for mitigating GIC effects through a fuzzy logic controlled variable resistor. Under normal operating conditions, there is almost no current flowing through the neutral of the power transformer, so activation of the resistor (R) is not required. The switch (SW) is in a closed state. Under GIC conditions (or any unbalanced fault current condition), the GIC or unbalanced fault current flows through the neutral of the transformer. It is detected by the fuzzy logic controller, which sends a signal to the switch to open. The resistor (R) is in the circuit and impedes the flow of current through the neutral, thereby protecting the transformer from getting overheated.

The fuzzy logic controller works in any nonlinear, uncertain, or imprecise situation. The power transformer as well as the power network are highly nonlinear. The magnitude of the GIC or unbalanced fault current is very uncertain and variable (i.e., it can vary from a low level to a very high or severe level). The fuzzy logic control generates a signal for the switch and determines the proper value of the resistor based on the severity of the disturbance.

In contrast to the "crisp" logic in Boolean theory that uses only two logic levels (i.e., 0 or 1), fuzzy logic is a branch of logic that admits infinite logic levels (i.e., from 0 to 1) to solve a problem that has uncertainties or imprecise parameters. It should be noted that fuzzy logic is distinct from probability analysis, and addresses a different form of uncertainty. For example, in set theory, a probabilistic approach will look at how probable it is that a variable is in a set (it either is or is not in the set, but there is uncertainty as to whether it is or not), whereas a fuzzy approach uses the concept of how much a variable is in a set. In the present context, a fuzzy control is a process control that is based on fuzzy logic, and is normally characterized by "IF-THEN" rules.

Figure 2:
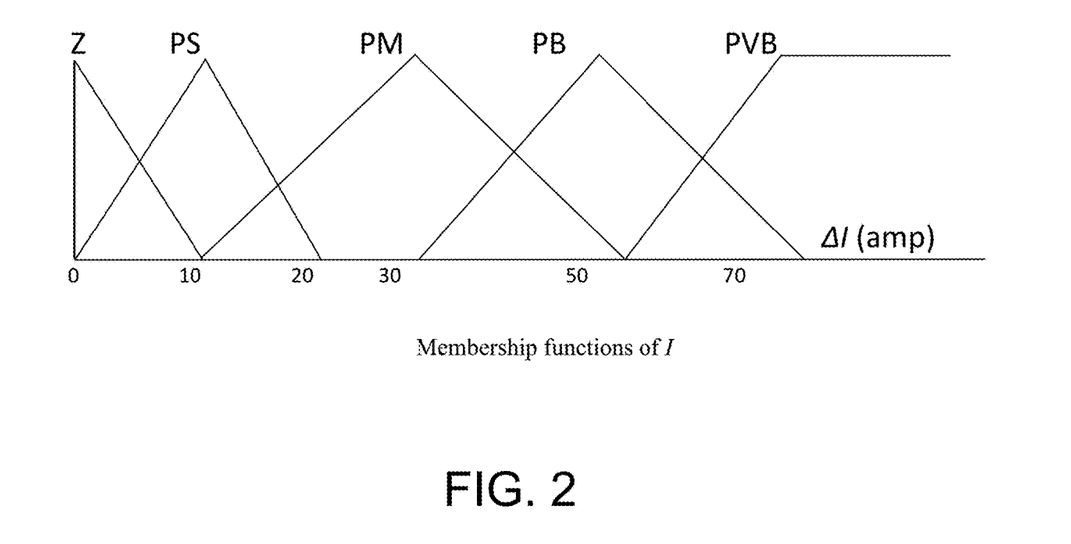
FIG. 2 shows several membership functions for $\text{dI}$.

For the fuzzy logic controller design, the deviation of the magnitude of the current flowing through the transformer neutral (DI), resulting from GIC or unbalanced faults, as described above, is the input. The resistance value of the variable resistor (R) is the output to be determined. Triangular membership functions for DI are shown in FIG. 2, with linguistic variables Z (Zero), PS (Positive Small), PM (Positive Medium), PB (Positive Big), and PVB (Positive Very Big). The equation of the triangular membership function used to determine the grade of membership values is as follows:

$$\mu_i(DI) = 1/b(b - 2|DI - a|) \quad (1)$$

where $\mu_i(DI)$ is the value of grade of membership, "b" is the width, "a" is the coordinate of the point at which the grade of membership is 1, and DI is the value of the input variable (deviation in current magnitude).

Usually, two input variables (e.g., error and its time derivative) are used for a fuzzy logic controller design. But in several embodiments, the fuzzy controller described herein uses only one input variable and one output variable, thereby allowing a reduction in the number of rules. The control rules of one embodiment of the fuzzy controller are shown in Table 1, where the values of R represent the output of the fuzzy controller, as described above.

TABLE 1

Fuzzy Rule Table

| DI (amp) | R (w) |
|---|---|
| Z | 0.0 |
| PS | 100 |
| PM | 250 |
| PB | 350 |
| PVB | 730 |

In several embodiments of the fuzzy controller design, a Mamdani-type interference mechanism is used, where the degree of conformity, $W_i$, of each fuzzy rule is as follows:

$$W_i = \mu_i(DI) \quad (2)$$

where $\mu_i(DI)$ is the value of grade of membership and i is the rule number.

In several embodiments, the defuzzification method used is Center-of-Area type, which determines the output crisp value for R (the resistance value). This is given by the following expression.

$$R = \Sigma W_i C_i / \Sigma W_i \quad (3)$$

where $C_i$ is the value of R in the fuzzy rule table. By following this equation, the proposed fuzzy controller will determine the proper value of the resistor as well as a signal for the switch based on the input.

Figure 3:
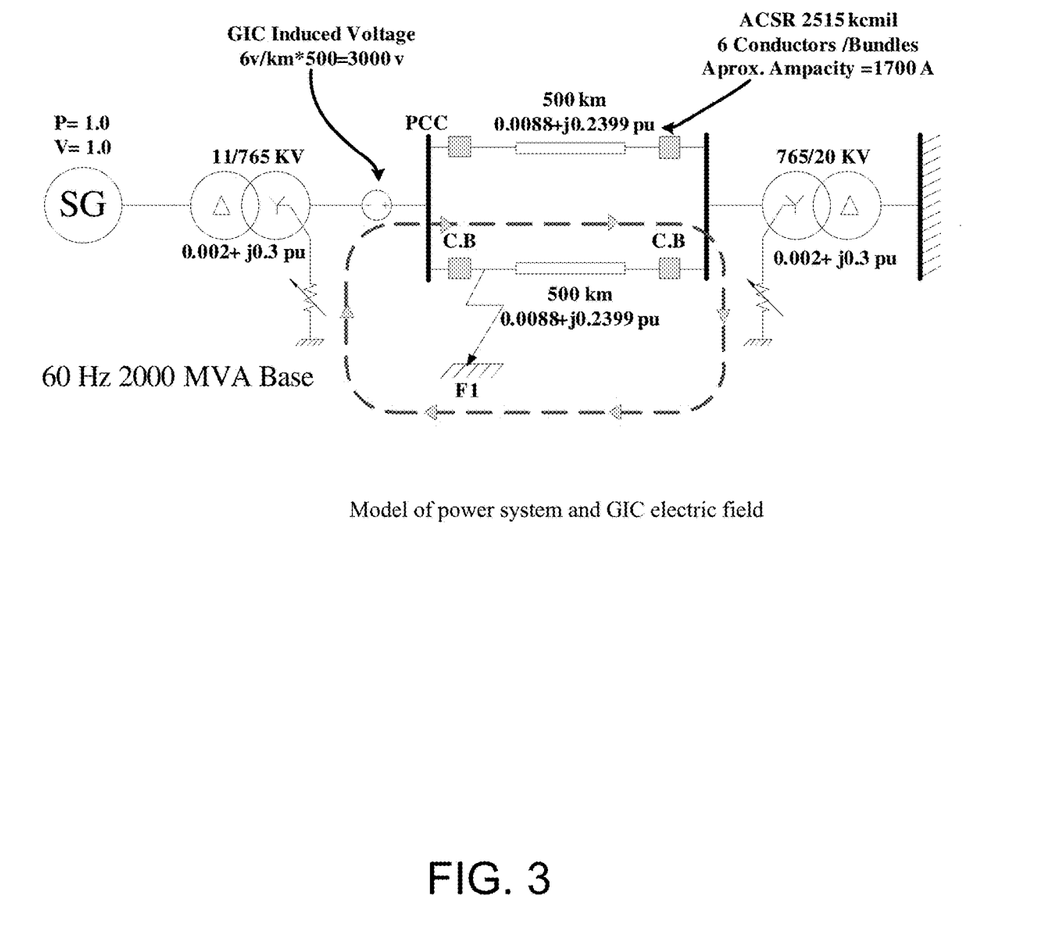
FIG. 3 shows a view of a power system implementing an exemplary embodiment of the present invention.
Figure 4:
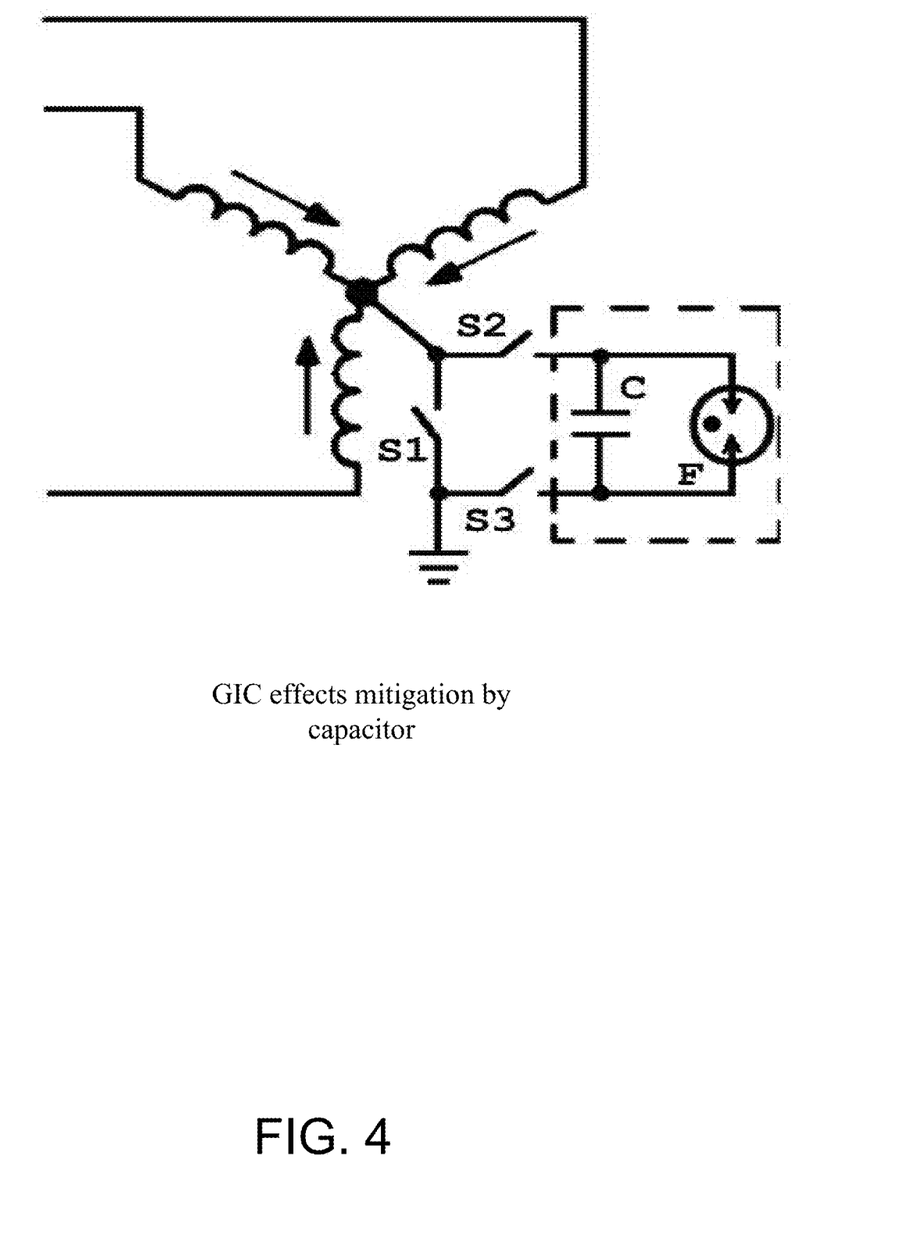
FIG. 4 shows a view of a system implementing a fixed capacitor device.

FIG. 3 shows a power system model incorporating the above variable resistor apparatus with a synchronous generator feeding power to double circuit transmission lines through a delta-wye type step-up transformer (i.e., a type of three-phase electrical power transformer that employs delta-connected windings on its primary and wye/star connected windings on its secondary). The wye side of the transformer is grounded with the controlled resistor. FIG. 4 shows a system grounded with a fixed capacitor (3.6 μF), for comparison.

It should be noted with respect to these figures that, to show the effectiveness of the present invention, the GIC (3000 Volts DC source based on presumed electric field of 6 v/km) is injected at the time of 0.5 sec for a period 1.0 sec. Furthermore, the single line-to-ground (SLG), double line-to-ground (2LG), and line-to-line (2LS) faults (as discussed below) are initiated at point F1 as shown in FIG. 3 at 0.3 sec in three different cases. In all fault cases, the circuit breakers open at 0.4 sec and reclose after 60 cycles (1.4 sec).

Figure 5:
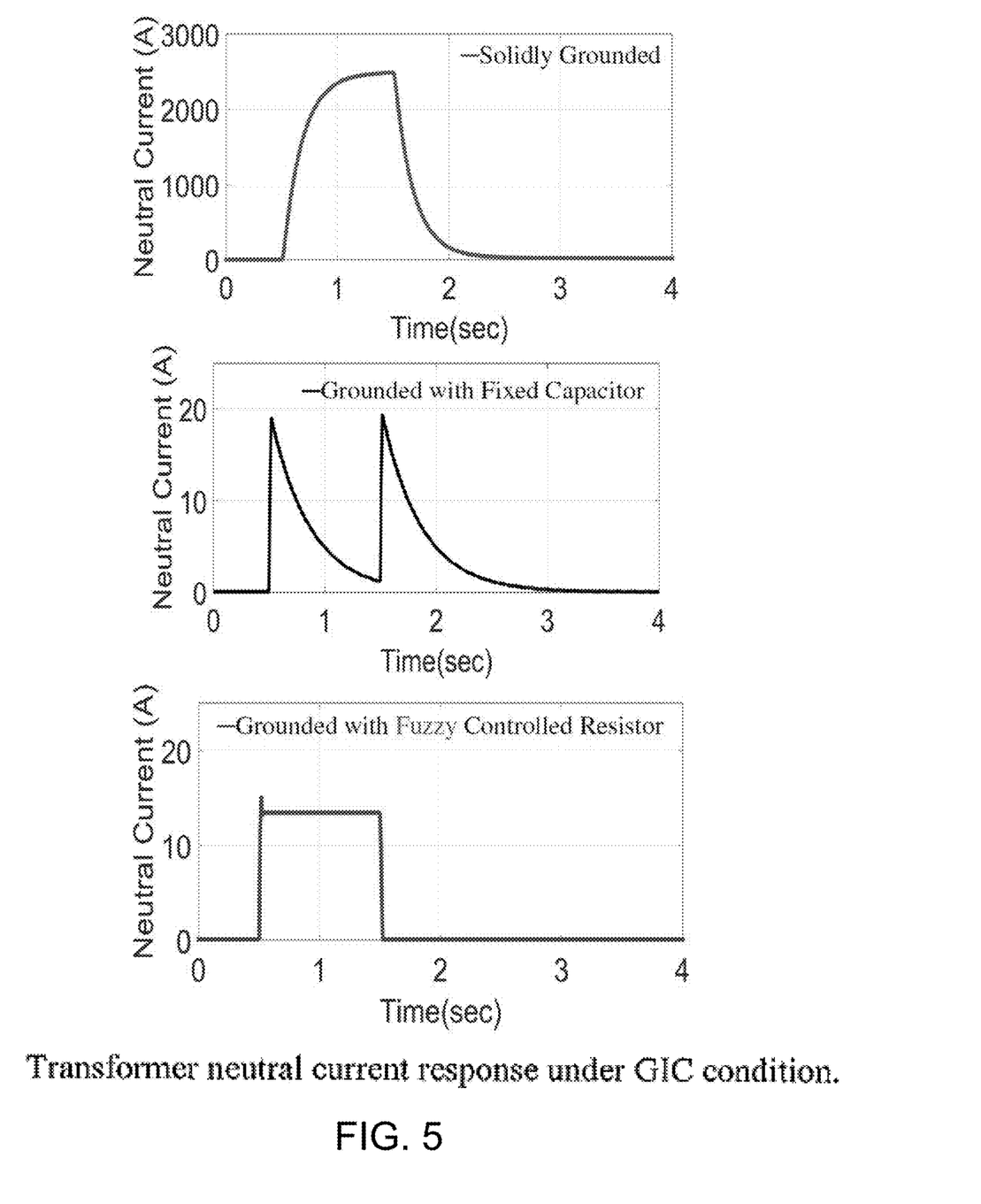
FIG. 5 shows comparative graphs of transformer neutral current response under a GIC condition.

FIG. 5 shows graphs of the neutral flow current of the transformer under a GIC condition, comparing (i) a base system (with solid grounding), to (ii) a system grounded with a fixed capacitor, and to (iii) a system grounded with a fuzzy-controlled resistor (in accordance with the present invention). As can be seen, the base system rises to a substantial peak (about 2500 amperes) with a significant tail that persists for about one second. The fixed capacitor reduces the overall current, but has two significant peaks (about 20 amperes) that quickly drop off, creating significant repeated fluctuations. The present invention reduces the overall current even more significantly as well as the fluctuations, resulting in a single short, sustained plateau of about 13 amperes for one second.

Figure 6:
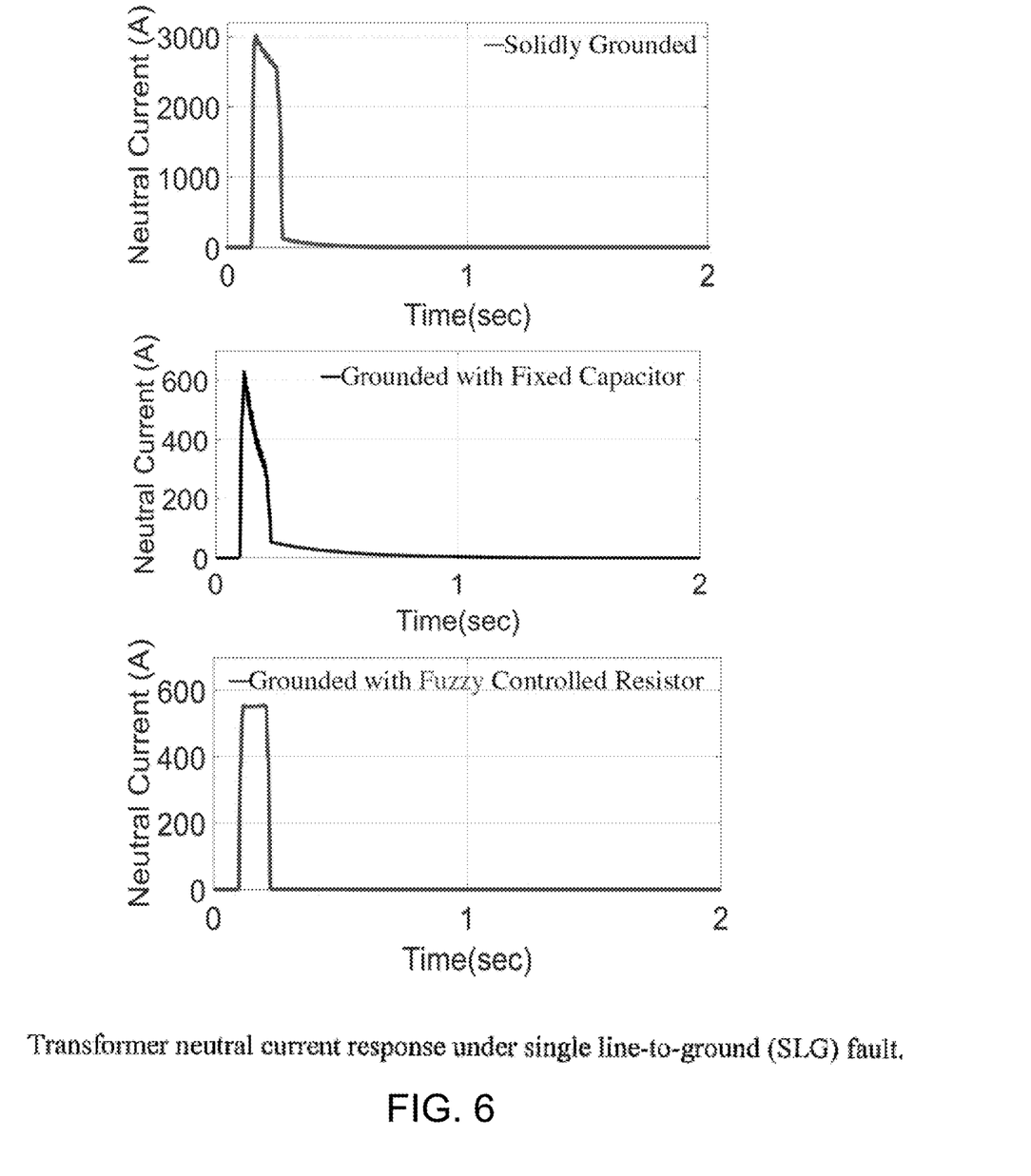
FIG. 6 shows comparative graphs of transformer neutral current response under a single line-to-ground (SLG) fault condition.

FIG. 6 shows comparative graphs for the same three systems, but for a single line-to-ground (SLG) fault condition. The base case results in a high surge of 2700 to 3000 amperes. The fixed capacitor system reduces this somewhat to 300 to 630 amperes. In both cases, there is a high spike, with an erratic drop off in current. The fuzzy-controlled resistor apparatus reduces the surge to a single flat peak of about 500 amperes, thereby reducing the overall neutral current flow as well as fluctuations in the current.

Figure 7:
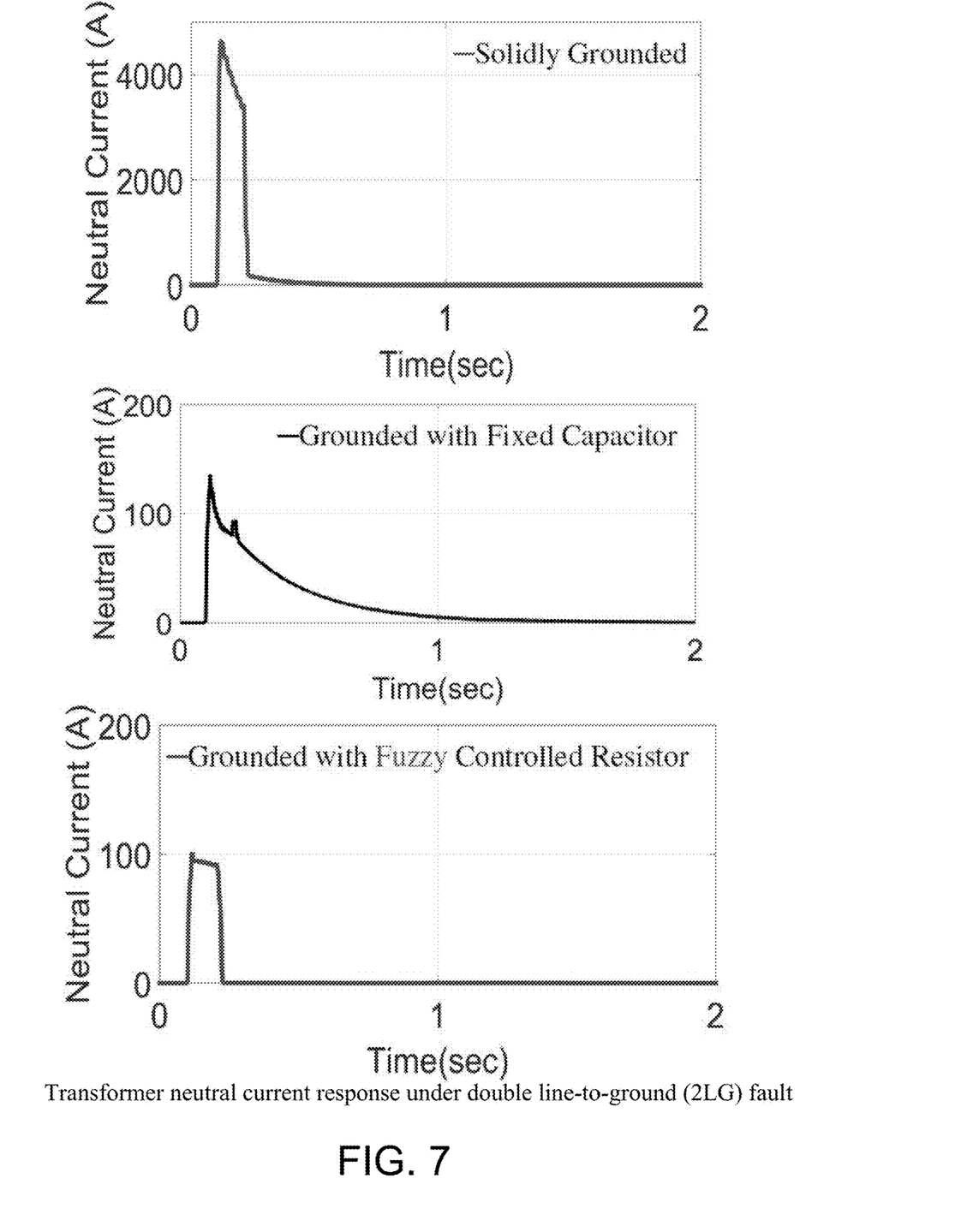
FIG. 7 shows comparative graphs of transformer neutral current response under a double line-to-ground (2LG) fault condition.

FIG. 7 shows comparative graphs for the same three systems, but for a double line-to-ground (2LG) fault condition. The base case results in a high surge of 3500 to 4500 amperes. The fixed capacitor system reduces this somewhat to 100 to 140 amperes. In both cases, there is a high spike with an erratic drop off in current. The fuzzy-controlled resistor apparatus reduces the surge to a single flat peak of about 95 amperes, thereby reducing the overall neutral current flow as well as fluctuations in the current.

Figure 8:
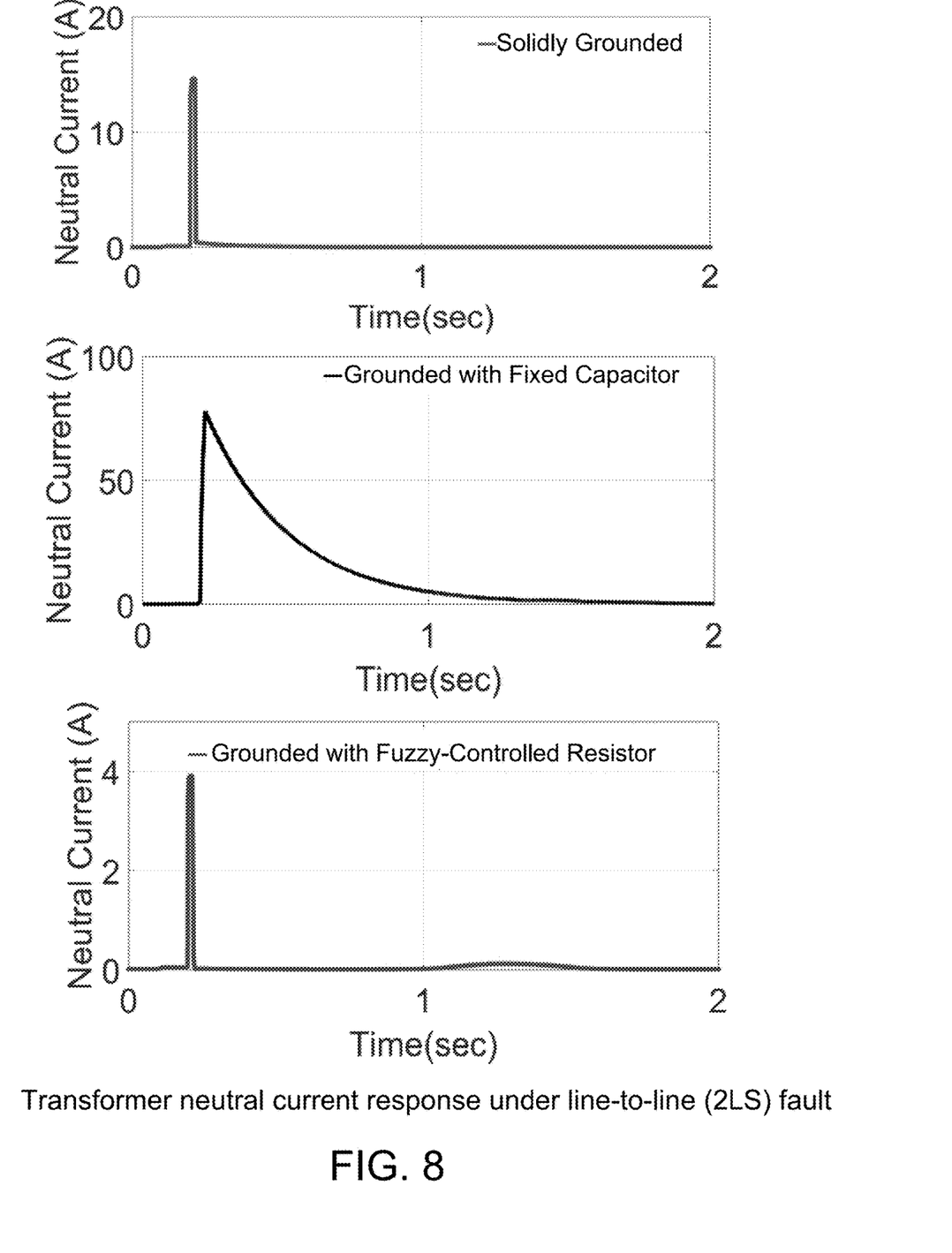
FIG. 8 shows comparative graphs of transformer neutral current response under a line-to-line (2LS) fault condition.

FIG. 8 shows comparative graphs for the same three systems, but for a line-to-line (2LS) fault condition. The base case results in a spike of about 15 amperes. The fixed capacitor system could not help in this case, as the spike goes to about 80 amperes. The fuzzy-controlled resistor apparatus reduces the spike to a single flat peak of about 4 amperes, thereby reducing the overall neutral current flow as well as fluctuations in the current.

Accordingly, as a result of the fuzzy logic controller of the present invention determining the optimal value of the resistor, the adverse effects of GICs can be more precisely and properly mitigated, and minimize the zero sequence current that flows through the neutral of a power transformer during any unbalanced faults (such as SLG, 2LG and 2LS faults) in the power network. In addition, the present invention is much cheaper in cost to manufacture and implement. Therefore, it can be very useful for transformer manufacturing companies and electric power industries.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A system for mitigating the effects of geomagnetically induced currents or unbalanced fault conditions in a power system, comprising:
   a fuzzy logic controller in electronic communication with a transformer protection circuit electrically connected to a transformer neutral, wherein variable levels of current flow through the transformer neutral; and
   a variable resistor in the transformer protection circuit;
   wherein the fuzzy logic controller is configured to accept as input a deviation in the level of current flow through the transformer neutral, and determine as output a resistance value of the variable resistor based upon said input.

2. The system of claim 1, further comprising a switch with an open position and a closed position, wherein said current flow is directed through the variable resistor in the open position.

3. The system of claim 1, wherein the level of current flow results from geomagnetically induced currents in a power system.

4. The system of claim 1, wherein the level of current flow results from unbalanced faults in a power system.

5. The system of claim 1, wherein the resistance of the variable resistor is set at 0 Ohms if there is no current flow through the transformer neutral.

6. The system of claim 1, wherein the resistance of the variable resistor is set from about 100 Ohms to about 730 Ohms, with higher resistance levels set for higher levels of current flow through the transformer neutral.

* * * * *